United States Patent

[11] 3,615,333

| | | | | |
|---|---|---|---|---|
| [72] | Inventors | Jack Lawrenson;<br>David Jones, Saint Helens, England | [50] | Field of Search............................................ 65/99, 101,<br>182, 60, 30 |
| [21] | Appl. No. | 813,655 | | |
| [22] | Filed | Apr. 4, 1969 | [56] | References Cited |
| [45] | Patented | Oct. 26, 1971 | | UNITED STATES PATENTS |
| [73] | Assignee | Pilkington Brothers Limited<br>Liverpool, England | 1,422,036 | 7/1922 Crowley et al................ 65/101 X |
| [32] | Priority | Apr. 23, 1968 | *Primary Examiner*—S. Leon Bashore |
| [33] | | Great Britain | *Assistant Examiner*—J. B. Hardaway |
| [31] | | 19148/68 | *Attorney*—Morrison, Kennedy & Campbell |

[54] FLOAT GLASS APPARATUS WITH ADJUSTABLE SURFACE MODIFICATION MEANS
4 Claims, 4 Drawing Figs.

[52] U.S. Cl........................................................ 65/182 R,
65/30, 65/99 A
[51] Int. Cl........................................................ C03b 18/02

ABSTRACT: The surface of float glass is treated by a body of molten metal which clings to a locating member positioned adjacent the glass surface, and adjustable end-deflection means including a wedge lodged above the ends of the locating member to maintain the design geometry of the lower face of the locating member.

Inventors
JACK LAWRENSON &
DAVID JONES

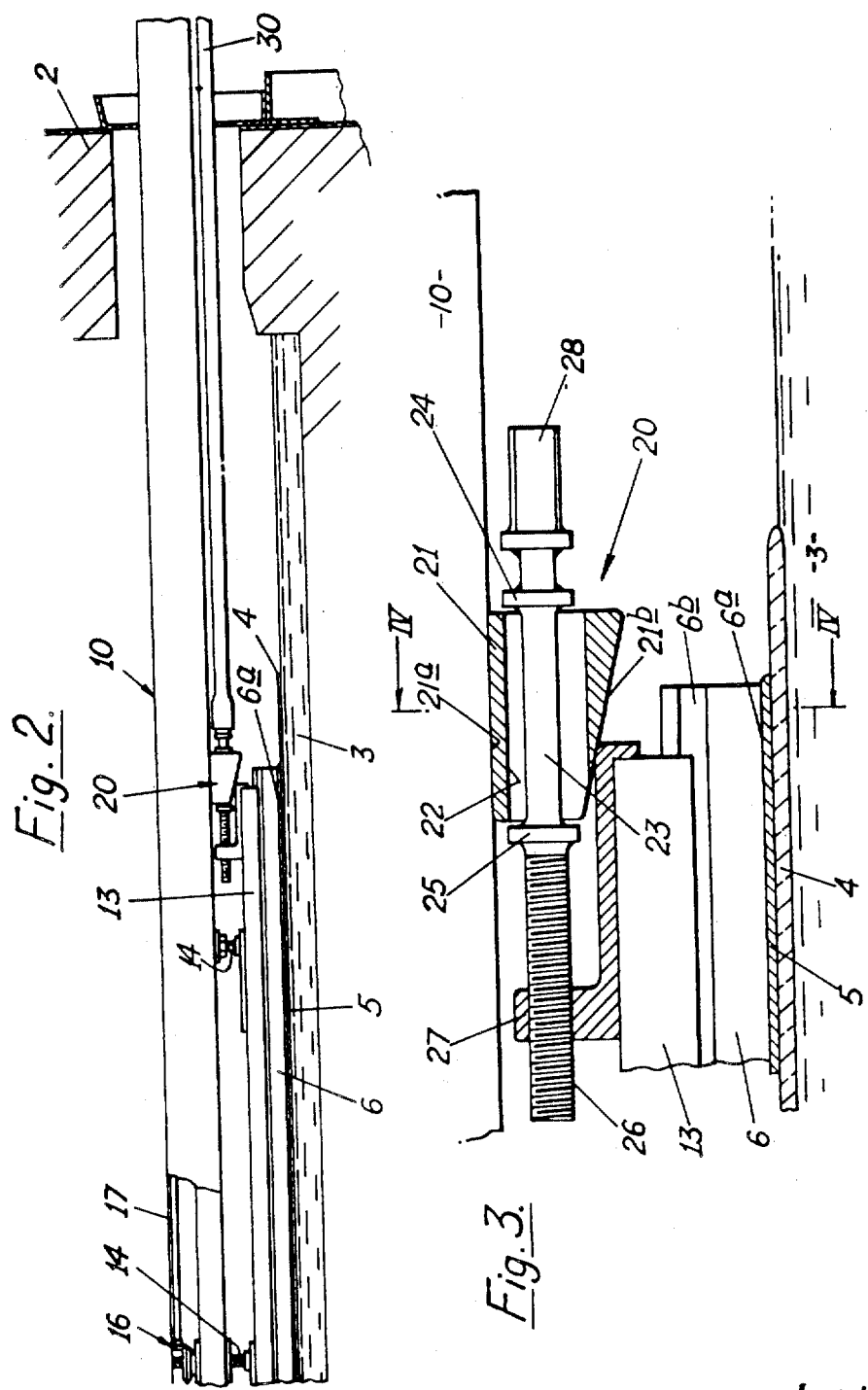

3,615,333

FLOAT GLASS APPARATUS WITH ADJUSTABLE SURFACE MODIFICATION MEANS

CROSS REFERENCES TO RELATED APPLICATIONS

This invention is an improvement in the invention described and claimed in copending application Ser. No. 795,240, filed 30th Jan. 1969.

BACKGROUND OF THE INVENTION I

This invention relates to the manufacture of glass and more particularly to the surface treatment of glass.

It has been proposed to impart desired surface characteristics to glass by maintaining a body of molten material which modifies the glass in contact with a surface of the glass, the latter being heated or in a semimolten state during manufacture and being advanced past the body of molten material as a continuous ribbon.

Surface modification of the glass is caused by migration from the molten material into the surface of the glass, and the modification may be controlled by regulating the oxidation conditions at the interface between the molten material and the glass or by passing a controlled electric current between the body of molten material and the glass.

The body of molten material in contact with the glass is maintained in a desired location by means of a locating member, usually in the form of an elongated bar extending horizontally across the glass ribbon, to which the molten material clings by a wetting action.

In use such a locating member has an elevated working temperature, being disposed close to the surface of the heated glass, and the member is usually supported near each end. Some degree of sagging of the center of the locating member relative to its ends necessarily occurs due to the weight of the member, and this leads to an undesirable variation in the spacing between the locating member and the surface modification imparted to the glass at different positions along the locating member.

In the aforementioned Patent application there is described apparatus for use in effecting surface treatment of heated glass including an elongated locating member against which a body of molten material, in use of the apparatus, being in contact with a surface of the glass to be treated, and said locating member being supported from a horizontal beam structure by a plurality of support members spaced apart along the length of the beam structure, and means for adjusting at least one of the support members vertically so as to compensate for natural flexion of the beam structure and to maintain the locating member linear, or in conformity with a predetermined shape.

An object of the present invention is to provide, in addition, means for adjusting at least one end of the locating member vertically so as to minimize thermal distortion at said end of the locating member.

SUMMARY

According to the present invention, apparatus for use in effecting surface treatment of heated glass includes an elongated locating member against which a body of molten material may be maintained by wetting contact, said molten material in use of the apparatus being in contact with a surface of the glass to be treated, adjustable support members for supporting the locating member from a horizontal beam structure, and adjustable end deflection means for effecting vertical adjustment of at least one end of the locating member so as to maintain the locating linear, or in conformity with a predetermined shape, under operational conditions.

Preferably the heated glass is supported on a bath of molten metal housed in a tank structure and the end deflection means are adjustable by means of a mechanical linkage from a position externally of the tank structure.

The end-deflection means in a preferred embodiment of the invention comprise a wedge which engages the said end of the locating member, or a holder therefore the wedge being adjustable in position longitudinally of the locating member to effect vertical adjustment of said end by a wedge action.

The adjustment of the position of the wedge may be effected by means of a screw-threaded shaft engaged in a threaded bore in a member which is fixed relative to the locating member, the said shaft engaging the wedge to effect adjustment thereof in an axial direction. The said shaft is preferably adapted to be drivingly connected to a torque-transmitting rod which extends outwardly through a wall of the tank structure.

BRIEF DESCRIPTION OF THE DRAWINGS

FIG. 2 is a diagrammatic partly broken-away vertical section on the line 2—2 of FIG. 1, illustrating a modification of the apparatus of FIG. 1 according to one embodiment of the invention;

FIG. 3 is an enlarged vertical section of one of the end-deflection means in the apparatus of FIG. 2.

DESCRIPTION OF THE PREFERRED EMBODIMENTS

Figure 1:
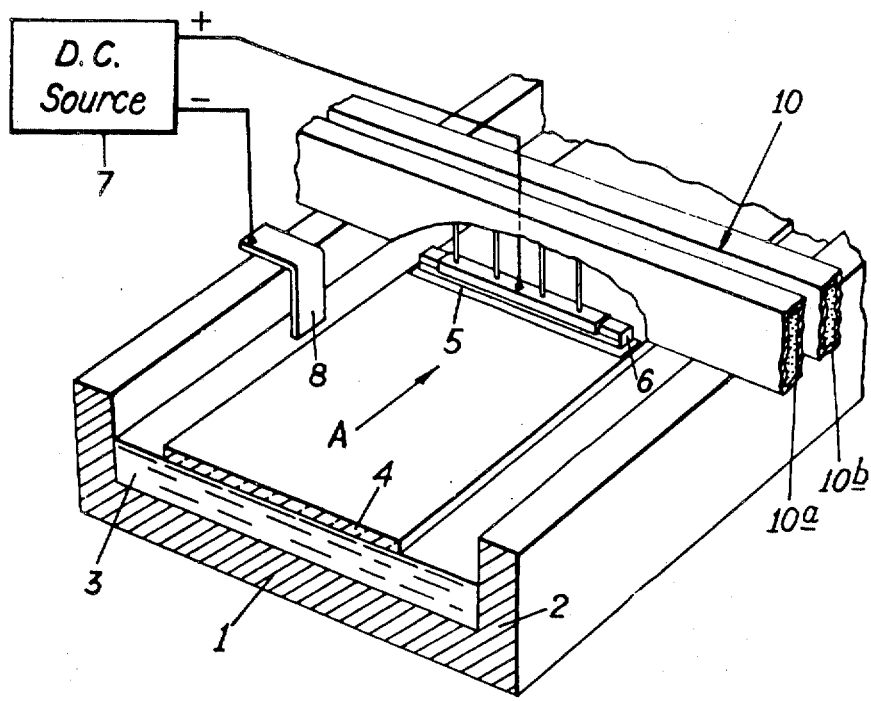
FIG. 1 is a partially broken-away diagrammatic perspective view of part of an apparatus for effecting surface treatment of a heated ribbon of float glass.

Referring to FIG. 1 there is shown part of a tank structure having a floor 1 and integral sidewalls 2. The tank structure contains a bath of molten metal 3, preferably tin or an alloy in which tin predominates and which has a specific gravity greater than that of glass. A roof structure, not shown in the interests of clarity, defines a headspace over the molten metal bath in which a protective atmosphere is maintained.

Glass, for example soda-lime-silica glass, is fed to the bath of molten metal 3 at a controlled rate, either as a preformed ribbon of glass, or as molten glass which is poured on to the bath 3 of molten metal at a controlled rate and which is permitted to flow laterally unhindered to the limit of its free flow to form a ribbon of glass 4. The glass ribbon 4 is advanced over the surface of the bath 3 in the direction of arrow A. The temperature of the glass ribbon 4 is regulated as it is advanced by means of controlled heaters immersed in the bath 3 and located in the headspace over the bath 3. These heaters are omitted from the drawings in the interests of clarity.

In order to impart desired surface characteristics to the upper face of the advancing ribbon of glass 4 a body of molten material 5 is maintained in contact with the upper face of the glass at a fixed station, the body 5 extending transversely across the glass ribbon 4. The molten body 5 is maintained in position by an elongated locating member 6 extending transversely across the ribbon 4 parallel to the upper face thereof so that a gap, for example of about 3 to 4 mm., is maintained between the lower surface of the member 6 and the upper face of the ribbon 4.

The body of molten material 5 wets the lower surface of the locating member 6 and clings thereto, so that the body 5 is confined between the lower surface of the member 6 and the upper face of the advancing ribbon 4, so that in effect the ribbon 4 passes continuously beneath the molten body 5. The clinging of the body 5 to the member 6 at least partly relieves the weight of the body 5 acting on the semimolten glass ribbon 4, and prevents the body falling through the ribbon, as well as preventing movement of the body 5 with the glass ribbon 4.

The molten material of the body 5 may be a molten metal or alloy. For example, the material may be tin, lead, bismuth, antimony, indium, zinc or thallium. Examples of suitable molten alloys are alloys of tin or lead or bismuth as a solvent metal with lithium, sodium, potassium, zinc, magnesium copper or silver as a solute metal. The locating member 6 may be one of the platinum group metals. Alternatively, the member 6 may comprise a base of, for example, copper, silver, brass, steel, alloys containing copper, alloys containing silver, or a refractory material, having a coating of an unreactive metal, for example, ruthenium.

As the glass ribbon 4 passes beneath the molten body 5 its surface is modified by an element of the body 5 which migrates into the glass. The migration is preferably controlled by passing an electric current through the body of molten material 5 and the glass ribbon 4. For this purpose the locating member 6 should be electrically conductive and is connected to a direct current electrical supply so that the molten body 5 acts as an anode and the molten metal bath 3 as a cathode of an electrolytic circuit. As illustrated diagrammatically in FIG. 1, a positive terminal of a direct current source 7 is connected to the locating member 6 and a negative terminal of said source to an electrode 8 immersed in the molten metal bath 3.

The surface modification of the glass ribbon 4 may alternatively be regulated by controlling oxidizing conditions in the body of molten material 5 so as to control the migration of an element from the body 5 into the glass surface.

A supply duct (not shown) is provided adjacent the member 5 for replenishing the body 5 of molten material with the element which migrates into the upper surface of the glass ribbon 4 in operation of the apparatus.

Figure 4:
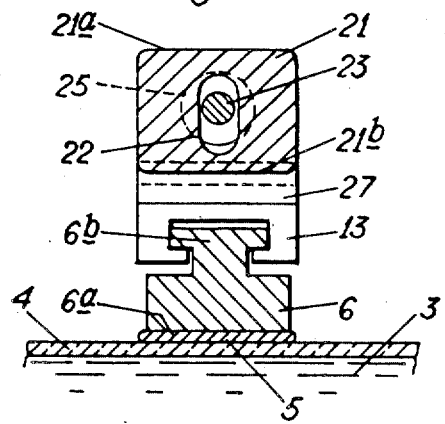
FIG. 4 is a section on line IV—IV of FIG. 3.

In order to ensure uniform surface treatment of the glass ribbon 4 across its width it is important to ensure that there is no variation in the size of the gap between the lower surface of the locating member 6 and the upper face of the glass across the width of the ribbon 4. With this object in view the locating member 6 is supported from a beam structure 10 extending transversely through the headspace above the molten metal bath 3 by a supporting arrangement illustrated in FIGS. 2 to 4. The beam structure 10 is shown partially broken away in FIG. 1.

The beam structure 10 comprises two parallel hollow beams 10a, 10b of rectangular section, each extending horizontally across the tank structure with its longer edge face disposed vertically. The hollow interiors of the beams 10a, and 10b form channels for the circulation of a coolant fluid, conveniently water. The coolant flow maintains the beam structure 10 at a temperature which is considerably lower than the temperature of the molten body 5 and locating member 6, which temperature is typically of the order of 750° C.

The locating member 6 is in the form of an elongated bar having a flat elongated lower surface 6a (FIG. 3) against which the molten body 5 clings in use of the apparatus. To facilitate replacement of the member 6 when worn without removing the beam structure 10 the member 6 has an elongated key portion 6b along its upper surface. The key portion 6b is received with freedom of sliding movement in an elongated holder 13 having a partly closed channel section so that the locating member 6 is held thereby without constraint. That is to say, the member 6 is able to undergo thermal expansion relative to the holder 13 without deformation occurring.

The holder 13 is suspended from the beam structure 10 by a plurality of spaced apart support member 14 comprising respective vertically extending tee bolts, each of which has an enlarged T-shaped head which engages freely in longitudinally extending tee slots provided in the upper surface of the holder 13. The support members 14 are spaced at intervals along the holder 13, and the number and spacing of the members is so chosen that the gravitational deflection of the holder 13, and, therefore, of the locating member 6, between neighboring suspension points is less than an acceptable maximum.

The beam structure 10 will undergo a natural flexion due to its own weight, and provision is made for adjusting the support members 14 so as to compensate for this flexion and to maintain the holder 13 and the locating member 6 in a desired configuration (in this case linear). In the illustrated embodiment support members 14 near the center of the holder 13 (one only of which is shown) are extendable vertically by means of respective screw devices operable through bevel gears 16 by a respective horizontal shaft 17 extending along the upper surface of the beam structure 10 to opposite respective ends thereof outwardly of the tank structure.

In this way the holder 13 (and locating member 6) may be flexed and maintained tangential to the line of curvature of the beam structure 10 at the center thereof. Similarly, if the glass ribbon 4 were supported on a curved surface, for example, when manufacturing curved glass sheet of a desired shape, the support members 14 could be adjusted relatively to each other to maintain the design geometry of the face 6a of the locating member. The outer ends of the locating member 6 outwardly of the outermost support members 14 have a tendency to 'curl' upwardly away from the surface of the bath 3, particularly where the locating member 6 has a substantial length overhanging the end support members 14. If such upward movement of the ends of the locating member were permitted the gap between the lower surface 6a of the locating member and the upper surface of the glass ribbon 4 at the ends of the member 6 would increase, and could cause the molten body 5 to recede from the ends of the member 6, and thereby decrease the overall width of the treated ribbon.

To prevent such upward movement of the ends of the locating member, adjustable end-deflection means are provided at each end of the holder 13. One of said end-deflection means is shown at 20 in FIG. 3, it being understood that identical end-deflection means is provided at the other end of the holder 13.

The end-deflection means 20 comprise a wedge 21 having a flat horizontal upper surface 21a which rests against and is slidable longitudinally along the lower horizontal surface of the beam structure 10. The wedge has a flat inclined lower surface 21b which faces downwardly and towards the center of the bath 3 and which engages an end of the holder 13.

The wedge 21 has a bore 22 therethrough extending parallel to the surface 21a. A shaft 23 extends through the bore 22 in a direction parallel to the longitudinal axis of the locating member 6. The shaft 23 has integral flanges 24, 25 disposed on opposite respective sides of the wedge 21.

The shaft 23 has a screw-threaded inner end portion 26 which is in threaded engagement with an internally threaded nut member 27 affixed to or integral with the holder 13. At its opposite, outer, end the shaft 23 has a key portion 28 of square section.

To effect vertical adjustment of the end of the locating member 6 the square section key portion 28 of the shaft 23 is engaged by a mating square socket in an end of a torque-transmitting adjuster rod 30 (FIG. 2) which extends outwardly through the adjacent sidewall 2 of the tank structure. The rod 30 is rotated about its axis to move the screw-threaded shaft 23 axially relative to the holder 13. The wedge 21 is engaged by one or the other of the flanges 24, 25 and moved axially outwardly or inwardly as the case may be, permitting the end of the holder 13 to rise, or forcing said end downwardly by wedge action, respectively.

The nut member 27 may alternatively be secured to the beam structure 10. Also, the wedge 21 may alternatively engage the respective end of the locating member 6, rather than the respective end of the holder 13.

We claim:

1. In a float glass apparatus with means for effecting surface treatment of a ribbon of float glass being advanced along a bath of molten metal wherein the improvement comprises an elongated locating member having a lower surface against which a body of molten material may be maintained by wetting contact, said molten material in use of the apparatus being in contact with the upper surface of the floating ribbon of glass, adjustable support members for supporting the locating member from a horizontal beam structure, and adjustable end-deflection means including a wedge lodged above the plane of said lower surface at one end of the locating member for effecting vertical adjustment of said end of the locating member so as to maintain said lower surface in a predetermined relationship with the glass surface under operational conditions.

2. Apparatus according to claim 1, including adjusting means for the wedge for changing the wedge position longitudinally of the locating member to effect vertical adjustment of said end by a wedge action.

3. Apparatus according to claim 2, wherein said adjusting means comprises a screw-threaded shaft engaged in a threaded bore in a member which is fixed relative to the locating member, the said shaft engaging the wedge to effect adjustment thereof in an axial direction.

4. Apparatus according to claim 3, wherein the bath of molten metal is housed in a tank structure, and the shaft is drivingly connected to a torque-transmitting rod which extends outwardly through a wall of the tank structure.

* * * * *